US006878453B2

(12) United States Patent
Abusleme et al.

(10) Patent No.: US 6,878,453 B2
(45) Date of Patent: Apr. 12, 2005

(54) MULTILAYERS OF POLYAMIDES AND CPVC

(75) Inventors: Julio A. Abusleme, Saronno (IT); Claudia Manzoni, Bologna (IT); Giambattista Besana, Mariano Comense (IT)

(73) Assignee: Ausimont S.p.A., Milan (IT)

( * ) Notice: Subject to any disclaimer, the term of this patent is extended or adjusted under 35 U.S.C. 154(b) by 280 days.

(21) Appl. No.: 10/157,851

(22) Filed: May 31, 2002

(65) Prior Publication Data

US 2002/0182424 A1 Dec. 5, 2002

(30) Foreign Application Priority Data

May 31, 2001 (IT) ..................................... MI2001A1151

(51) Int. Cl.$^7$ ......................... B32B 27/00; B32B 27/08
(52) U.S. Cl. ................................ 428/474.4; 428/411.1; 428/421; 428/422; 428/475.8; 428/476.3
(58) Field of Search ........................... 428/474.4, 411.1, 428/421–422, 475.8, 476.3

(56) References Cited

U.S. PATENT DOCUMENTS

| 4,183,777 A | | 1/1980 | Summers et al. |
| 4,543,378 A | | 9/1985 | Suhara et al. ............... 524/100 |
| 5,480,721 A | * | 1/1996 | Pozzoli et al. .............. 428/422 |

FOREIGN PATENT DOCUMENTS

| EP | 0 866 079 A2 | 9/1998 |
| EP | 1 038 914 A1 | 9/2000 |
| EP | 1 101 994 A2 | 5/2001 |

OTHER PUBLICATIONS

JP 06055703 (Mitsubishi Plastics Ind. Ltd.), Mar. 1, 1994 (Abstract).

* cited by examiner

Primary Examiner—P. Hampton Hightower
(74) Attorney, Agent, or Firm—Arent Fox, PLLC

(57) ABSTRACT

A multilayer comprising at least one layer A) of at least one thermoprocessable polymer containing at least 5% by weight of chlorinated polyvinyl chloride (CPVC) and one layer B) based on polyamides having an amount of —NH$_2$ end groups in the range 20–300 μeq/g.

20 Claims, No Drawings

MULTILAYERS OF POLYAMIDES AND CPVC

The present invention relates to multilayers (laminates) comprising at least one polymer layer containing at least 5% of chlorinated polyvinyl chloride (CPVC) and one polyamide layer, characterized in having a complete adhesion among the layers. The adhesion between the layers is so high that at the delamination tests the specimen breaks without the layer separation.

Said multilayers show, besides a high adhesion among the layers, good mechanical properties, good chemical and flame resistance.

It is known that polyamides have good mechanical properties but a poor resistance to flame and to chemical agents CPVC shows a poor ductility but has a good resistance to flame and to chemical agents The need was therefore felt to have available laminates showing the good mechanical properties of the polyamides combined with the good resistance to flame and to chemical agents of CPVC.

CPVC contains from 58% to 75% by weight of chlorine and is obtained by PVC chlorination.

The polyvinylchloride (PVC) has a chlorine content of 56.8% by weight.

Tests carried out by the Applicant have shown that by a bilayer of CPVC polymers with polyamides, obtained for example by applying a pressure on the overlapped polymer layers maintained at the softening temperature or by co-extruding the layers, the adhesion is not obtained.

The Applicant has surprisingly and unexpectedly found that it is possible to obtain multilayers, having a complete adhesion between CPVC and polyamides when polyamides are characterized by having an amount of —NH$_2$ end groups of at least 20 µeq/g.

An object of the present invention is therefore a multilayer comprising at least one bilayer (laminate) between:
A) a layer of at least one thermoprocessable polymer containing at least 5% by weight of chlorinated polyvinyl chloride (CPVC) having a chlorine content from 58% to 75% by weight, preferably from 60% to 70% by weight;
B) a layer based on polyamides having an amount of —NH$_2$ end groups in the range 20–300 µeq/g, preferably 30–150 µeq/g.

The thermoprocessable polymer of layer A) can be selected from PVC and/or polyvinylidene chloride (PVDC). Preferably layer A) is formed by CPVC.

Optionally layer B) of the bilayer A/B can be placed on top of another layer A) or on top of layer C) based on thermoprocessable copolymers of ethylene with chlorotrifluoroethylene (CTFE), and/or tetrafluoroethylene (TFE), preferably CTFE, and with acrylic monomers of formula:

$$CH_2=CH—CO—O—R_2 \quad (a)$$

wherein R$_2$ is H or a linear or branched C$_1$–C$_{20}$ alkyl radical, cycloalkyl radical; R$_2$ optionally contains Cl, O, N and/or one or more functional groups selected from —OH, —COOH, epoxide, ester or ether; wherein the monomer (a) amount is in the range 0.01–15% by moles with respect to the sum of the monomers of ethylene and of CTFE and/or TFE.

The thermoprocessable copolymers of layer C) are preferably formed by:
from 10% to 70% by moles, preferably from 35% to 55% of ethylene;
from 30% to 90% by moles, preferably from 45% to 65%, of a fluorinated monomer selected from tetrafluoroethylene, chlorotrifluoroethylene, or mixtures thereof;
from 0.05% to 15% by moles of the acrylic co-monomer (a) referred to the sum of the previous monomers.

As acrylic monomer of formula (a), n-butylacrylate (n-BuA) is preferably used.

The layer C) can also be formed by a blend of the co-polymers of layer C) and the thermoprocessable copolymers of ethylene with chlorotrifluoroethylene (CTFE) and/or tetrafluoroethylene (TFE), provided that the blend contains an amount of acrylic monomer (a) in the range 0.01%–15% by moles with respect to the total sum of the monomers of ethylene and of CTFE and/or TFE of the blend.

Preferably in layer C) the monomer amount of (a) is lower than 1% by moles with respect to the sum of the monomers of ethylene and chlorotrifluoroethylene and/or tetrafluoroethylene.

Optionally on top of layer C) of the multilayer A/B/C, can be put a layer C1) formed by thermoprocessable copolymers of ethylene with chlorotrifluoroethylene (CTFE) and/or tetrafluoroethylene (TFE).

On top of layer A) of the bilayer A/B another layer B) can be put, which can be further in contact with a layer C) and subsequently on layer C) can be placed a layer C1). Examples of possible multilayers are:

A/B/A
A/B/C
A/B/C/C1
B/A/B
C/B/A/B
C1/C/B/A/B
C/B/A/B/C
C1/C/B/A/B/C
Cl/C/B/A/B/C/Cl

In a multilayer that ends with layer B, optionally, on this layer can be placed a layer B1) formed by a polyamide with a content of —NH$_2$ end groups lower than 20 µeq/g.

The polyamides having an amount of —NH$_2$ end groups, higher than 20 µeq/g, can be prepared according to known methods, for example according to U.S. Pat. No. 4,543,378, wherein a chain transfer agent is used in the polymerization phase. As example of chain transfer agents, m- or p-xylylendiamine, hexamethylendiamine or dodecamethylendiamine can be cited.

The polyamide of layer B) having an amount of end groups —NH$_2$ higher than 20 µeq/g can also be obtained by mixing polyamides having different contents of —NH$_2$ end groups so that the final mixture contains an amount of —NH$_2$ end groups higher than 20 µeq/g.

The polyamides of layer B), can be a (co)polyamide, for example, polyamide 6 (PA 6), polyamide 66 (PA 66), polyamide 11 (PA 11), polyamide 12 (PA 12).

The polyamides of layer B), can optionally contain diamines.

The Applicant has also found that the multilayers of the present invention endowed with excellent adhesions can be obtained by using as layer B) a blend of a polyamide having an amount of —NH$_2$ end groups lower than 20 µeq/g and 0.1–5% by weight, preferably 0.5–2% by weight, of one or more diamines.

The polyamides having —NH$_2$ end groups lower than 20 µeq/g, can be (co)polyamides, such as for example, polyamide 6, polyamide 66, polyamide 11, polyamide 12.

Non limitative examples of diamines are protected amines, such as for example hexamethylendiaminecarbamate and N,N'-dicinnamylidene-1,6 hexanediamine, C$_4$–C$_{20}$ aliphatic diamines, such as for example dodecyldiamine and decyldiamine, aromatic diamines, such as for example paraxylilendiamine. Aliphatic and aromatic protected diamines are preferred.

The single layers of the invention can optionally contain additives such as fillers for example polytetrafluoroethylene (PTFE), silicates, graphite, titanium dioxide, lubricants, pigments, fire retardants, plasticizers, thermal and UV stabilizers.

The multilayer structures of the present invention can be obtained by co-extrusion. Alternatively, the single layers are laminated by compression at the softening temperature.

When layer A) and layer C) are formed by self-supporting plaques suitable to build, by their combination, hybrid structures such as for example those used in wet-benches, their junction-coupling can be carried out by welding along a contact line using a weld rod, constituted by the above defined polyamide of layer B).

Optionally on top of layers A) and C) a layer B) can be placed.

The multilayers according to the present invention can be used as structural elements for benches, coating panels, in the building of structures such as, for example, the wet-benches used in the semiconductor industry.

Some illustrative examples follow, which are not limitative of the present invention.

The following characterizations were carried out on the polymers of the examples:

Melt Flow Index (M.I.)

The M.I. of the fluorinated polymers is measured according to the method ASTM 3275-89, at 275° C. and with a load of 2.16 kg;

Second Melting Temperature ($T_{mII}$)

The $T_{mII}$ of the fluorinated polymers is determined by differential scanning calorimetry (DSC);

Glass Transition Temperature (Tg)

The Tg of the polymers CPVC is determined by differential scanning calorimetry (DSC);

Chlorine Content in CPVC it has been determined by elemental analysis;

—$NH_2$ End Groups

The number of the end groups —$NH_2$ of polyamides is determined by preparing a solution at 2% of polyamide in m-cresol and subsequent titration with perchloric acid.

EXAMPLES

Example 1

Layer A)

CPVC

From a CPVC polymer having a Tg of 112° C. and a chlorine content of 64.24% by weight, plaques having a thickness of 1.5 mm have been obtained by compression moulding.

Layer B)

Polyamide 12 (PA 12) Having —$NH_2$ End Groups Equal to 110 µeq/g

Some plaques of the polyamide having a thickness of 1.5 mm have been obtained by compression moulding.

Preparation of the A/B Laminate

The plaques of the single layers A and B, previously obtained, have been overlapped and kept under pressure at a temperature of 240° C. for 5 minutes.

By applying a mechanical force one tries to separate layer A from layer B.

One cannot measure the adhesion force between layer A and layer B. By increasing the force to separate the layers, one breaks the manufactured article without obtaining the delamination. This shows that the laminate according to the invention shows a high adhesion.

Example 2 (Comparative)

Layer A)

The same polymer of Example 1 is used.

Layer B)

PA 12 Having —$NH_2$ End Groups Equal to 13 µeq/g

Some plaques of the polyamide having a thickness of 1.5 mm have been obtained by compression moulding.

Preparation of the A/B Laminate

The plaques of the single layers A and B, previously obtained, have been overlapped and kept under pressure at a temperature of 240° C. for 5 minutes.

The A/B laminate does not show any adhesion between the layers.

Example 3 (Comparative)

Layer A)

The same polymer of Example 1 is used.

Layer B)

PA 12 Having —$NH_2$ End Groups Equal to 18 µeq/g

The polyamide has been obtained by mechanically mixing 50 g of PA 12 of Example 1 (—$NH_2$=110 µeq/g) with 950 g of PA 12 of Example 2 (—$NH_2$=13 µeq/g). Then the blend has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 240° C. for 5 minutes.

The A/B laminate does not show any adhesion between the layers.

Example 4

Layer A)

The same polymer of Example 1 is used.

Layer B)

PA 12 Having —$NH_2$ End Groups Equal to 23 µeq/g

The polyamide has been obtained by mechanically mixing 100 g of PA 12 of Example 1 (—$NH_2$=110 µeq/g) with 900 g of PA 12 of Example 2 (—$NH_2$=13 µeq/g). Then the blend has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 240° C. for 5 minutes.

By applying a mechanical force one tries to separate layer A from layer B.

One cannot measure the adhesion force between layer A and layer B. By increasing the force to separate the layers, one breaks the manufactured article without obtaining the delamination. This shows that the laminate according to the invention shows a high adhesion.

Example 5

Layer A)

The same polymer of Example 1 is used.

Layer B)

PA 12 having —NH$_2$ end groups equal to 32 µeq/g

The polyamide has been obtained by mechanically mixing 200 g of PA 12 of Example 1 (—NH$_2$=110 µeq/g) with 800 g of PA 12 of Example 2 (—NH$_2$=13 µeq/g). Then the blend has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 240° C. for 5 minutes.

By applying a mechanical force one tries to separate layer A from layer B.

One cannot measure the adhesion force between layer A and layer B. By increasing the force to separate the layers, one breaks the manufactured article without obtaining the delamination. This shows that the laminate according to the invention shows a high adhesion.

Example 6

Layer A)

The same polymer of Example 1 is used.

Layer B)

PA 12 having —NH$_2$ end groups equal to 45 µeq/g

The polyamide has been obtained by mechanically mixing 330 g of PA 12 of Example 1 (—NH$_2$=110 µeq/g) with 670 g of PA 12 of Example 2 (—NH$_2$=13 µeq/g). Then the blend has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 240° C. for 5 minutes.

By applying a mechanical force one tries to separate layer A from layer B.

One cannot measure the adhesion force between layer A and layer B. By increasing the force to separate the layers, one breaks the manufactured article without obtaining the delamination. This shows that the laminate according to the invention shows a high adhesion.

Example 7

Layer A)

The same polymer of Example 1 is used.

Layer B)

Polyamide PA 12 Having —NH$_2$ End Groups Equal to 13 µeq/g Blended with 1% by Weight of Diamine One kilogram of polyamide (PA 12) in granules, having —NH$_2$ end groups equal to 13 µeq/g, has been blended with 1% by weight of hexamethylendiamine monocarbamate. Then it has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 240° C. for 5 minutes.

By applying a mechanical force one tries to separate layer A from layer B.

One cannot measure the adhesion force between layer A and layer B. By increasing the force to separate the layers, one breaks the manufactured article without obtaining the delamination. This shows that the laminate according to the invention shows a high adhesion.

Example 8

Layer A)

The polymer of Example 1 is used.

Layer B)

The polyamide of Example 1 is used.

Layer C)

E/CTFE/n-BuA 40/55/5% by Moles

The copolymer has been prepared by known methods described for example in EP 866 079 and is characterized by:

M.I. 15 g/10'

T$_{mII}$ 180°–200° C.

Plaques having a thickness of 1.5 mm have been obtained from the copolymer by compression moulding.

Preparation of the A/B/C Multilayer

The plaques of the single layers A, B and C, previously obtained, have been overlapped in the order A/B/C, and kept under pressure at a temperature of 240° C. for 5 minutes.

By applying a mechanical force one tries to separate layer A from layer C of the multilayer A/B/C.

One cannot measure the separation force. This shows that the multilayer of the invention shows a high adhesion among the layers.

Example 9

Layer A)

The same polymer of Example 1 is used.

Layer B)

The same polyamide of Example 6 is used.

Layer C)

The same copolymer of Example 8 is used.

Preparation of the A/B/C Multilayer

The plaques of the single layers A, B and C, previously obtained, have been overlapped in the order A/B/C, and kept under pressure at a temperature of 240° C. for 5 minutes.

By applying a mechanical force one tries to separate layer A from layer C of the A/B/C multilayer.

One cannot measure the separation force. This shows that the multilayer of the invention shows a high adhesion among the layers.

Example 10

Layer A)

The same polymer of Example 1 is used.

Layer B)

The same polyamide of Example 7 is used.

Layer C)

The same copolymer of Example 8 is used.
Preparation of the A/B/C Multilayer

The plaques of the single layers A, B and C, previously obtained, have been overlapped in the order A/B/C, and kept under pressure at a temperature of 240° C. for 5 minutes.

By applying a mechanical force one tries to separate layer A from layer C of the A/B/C multilayer.

One cannot measure the separation force. This shows that the multilayer of the invention shows a high adhesion among the layers.

Example 11 (Comparative)

Layer A)

The same polymer of Example 1 is used.

Layer C)

The same copolymer of Example 8 is used.
Preparation of the A/C Laminate

The plaques of the single layers A and C, previously obtained, have been overlapped and kept under pressure at a temperature of 240° C. for 5 minutes.

The laminate A/C does not show any adhesion between the layers.

What is claimed is:

1. A multilayer comprising at least one bilayer (laminate) between:
   A) a layer of at least one thermoprocessable polymer containing at least 5% by weight of chlorinated polyvinyl chloride (CPVC) having a chlorine content from 58% to 75% by weight;
   B) a layer based on polyamides having an amount of —NH$_2$ end groups in the range 20–300 μeq/g.

2. A multilayer (laminate) according to claim 1, wherein layer B) of the A/B bilayer is placed on top of layer A) or of layer C) based on thermoprocessable copolymers of ethylene with chlorotrifluoroethylene (CTFE) and/or tetrafluoroethylene (TFE) and with acrylic monomers of formula:

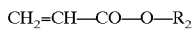

$$CH_2=CH—CO—O—R_2$$

wherein:
   R$_2$ is H or a linear or branched, C$_1$–C$_{20}$ alkyl radical, cycloalkyl radical;
   R$_2$ optionally contains Cl, O, N and/or one or more functional groups selected from —OH, —COOH, epoxide, ester or ether; wherein the monomer (a) amount is in the range 0.01–15% by moles with respect to the sum of the monomers of ethylene and of CTFE and/or TFE.

3. A multilayer according to claim 1, wherein the thermoprocessable copolymer of layer A) is formed by polyvinyl chloride (PVC) and/or polyvinylidene chloride (PVDC).

4. A multilayer according to claim 2, wherein the thermoprocessable copolymers of layer C) are formed by:
   from 10% to 70% by moles of ethylene;
   from 30% to 90% by moles of a fluorinated monomer selected from tetrafluoroethylene, chlorotrifluoroethylene, or mixtures thereof;
   from 0.05% to 15% by moles of the acrylic comonomer (a) referred to the sum of the previous monomers.

5. A multilayer according to claim 2, wherein n-butylacrylate (n-BuA) is used as acrylic monomer of formula (a).

6. A multilayer according to claim 2, wherein layer C) is formed by a blend of the copolymers of layer C) and the thermoprocessable copolymers of ethylene with chiorotrifluoroethylene (CTFE) and/or tetrafluoroethylene (TFE), provided that the blend contains an amount of acrylic monomer (a) in the range 0.01%–15% by moles with respect to the total sum of the monomers of ethylene and of CTFE and/or TFE of the blend.

7. A multilayer according to claim 2, wherein on top of layer C) of the multilayer A/B/C there is a layer C1) formed by thermoprocessable copolymers of ethylene with chiorotrifluoroethylene (CTFE) and/or tetrafluoroethylene (TFE).

8. A multilayer according to claim 1, wherein on top of layer A) of the bilayer A/B there is a layer B); on the latter layer there is optionally in sequence a layer C) and a layer C1).

9. A multilayer according to claim 1, wherein when the multilayer ends with layer B), on this layer there is a layer B1) formed by a polyamide with a content of —NH$_2$ end groups lower than 20 μeq/g.

10. A multilayer according to claim 1, wherein the polyamide of layer B) having an amount of —NH$_2$ end groups higher than 20 μeq/g is obtained by mixing polyamides having different contents of —NH$_2$ end groups so that the final mixture contains an amount of —NH$_2$ end groups higher than 20 μeq/g.

11. A multilayer according to claim 1, wherein layer B) is a blend of a polyamide having an amount of —NH$_2$ end groups lower than 20 μeq/g and 0.1–5% by weight, of one or more diamines.

12. A multilayer according to claim 11, wherein the diamines are selected from the group formed by: hexamethylendiaminecarbamate, N, N'-dicinnamylidene-1,6 hexandiamine, C$_4$–C$_{20}$ aliphatic diamines, dodecyldiamine, decyldiamine, aromatic diamines, and para-xylilendiamine.

13. Structures as wet-benches obtained by welding the multilayer according to claim 1, wherein a welding layer of polyamide B) interposed and/or in contact with the surfaces A) and C) to be put together, is used.

14. A multilayer according to claim 1, wherein the chlorine content is from 60% to 70% by weight.

15. A multilayer according to claim 1, wherein the amount of —NH$_2$ end groups is in the range 30–150 μeq/g.

16. A multilayer (laminate) according to claim 2, wherein layer B) of the A/B bilayer is placed on top of layer A) or of layer C) based on thermoprocessable copolymers of ethylene with CTFE.

17. A multilayer according to claim 4, wherein the thermoprocessable copolymers of layer C) are formed by:
   from 35% to 55% by moles of ethylene;
   from 30% to 90% by moles of a fluorinated monomer selected from tetrafluoroethylene, chlorotrifluoroethylene, or mixtures thereof;
   from 0.05% to 15% by moles of the acrylic comonomer (a) referred to the sum of the previous monomers.

18. A multilayer according to claim 4, wherein the thermoprocessable copolymers of layer C) are formed by:
from 10% to 70% by moles of ethylene;
from 45% to 65% by moles of a fluorinated monomer selected from tetrafluoroethylene, chlorotrifluoroethylene, or mixtures thereof;
from 0.05% to 15% by moles of the acrylic comonomer (a) referred to the sum of the previous monomers.

19. A multilayer according to claim 4, wherein the thermoprocessable copolymers of layer C) are formed by:
from 35% to 55% of ethylene;
from 45% to 65% of a fluorinated monomer selected from tetrafluoroethylene, chlorotrifluoroethylene, or mixtures thereof;
from 0.05% to 15% by moles of the acrylic comonomer (a) referred to the sum of the previous monomers.

20. A multilayer according to claim 11, wherein layer B) is a blend of a polyamide having an amount of —NH$_2$ end groups lower than 20 $\mu$eq/g and 0.5–2% by weight of one or more diamines.

* * * * *